L. S. REYNOLDS.

Friction Bolt for Flour Mills.

No. 1,443. Reissued March 31, 1863.

Signature of witnesses lost

Inventor.
Levi Simpson Reynolds
by his Attys
Mason Fenwick & Lawrence

N. PETERS, Photo-Lithographer, Washington, D. C.

UNITED STATES PATENT OFFICE.

L. SIMPSON REYNOLDS, OF INDIANAPOLIS, INDIANA.

IMPROVEMENT IN FRICTION-BOLTS FOR FLOUR-MILLS.

Specification forming part of Letters Patent No. 23,394, dated March 29, 1859; Reissue No. 1,443, dated March 31, 1863.

*To all whom it may concern:*

Be it known that I, LEVI SIMPSON REYNOLDS, of Indianapolis, in the county of Marion and State of Indiana, have invented a new and useful Improvement in Flour-Bolts, known as "Reynolds' Portable Friction-Bolt;" and I do hereby declare that the following is a full, clear, and exact description thereof, reference being had to the accompanying drawings, making a part of this specification, in which—

Figure 1:
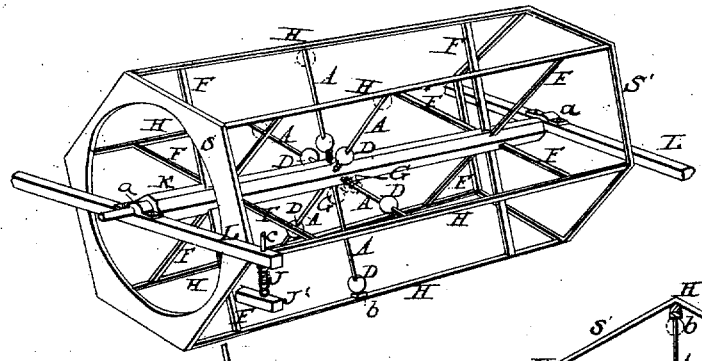
Figure 2:
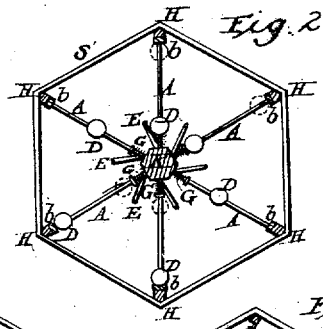
Figure 3:
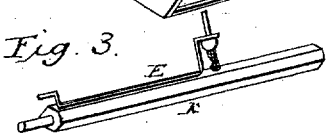
Figure 4:
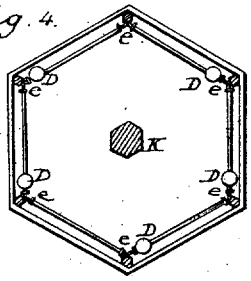
Figure 5:
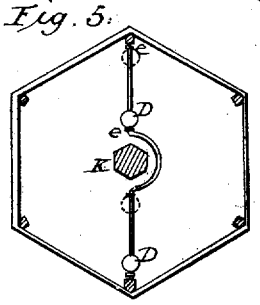
Figure 6:
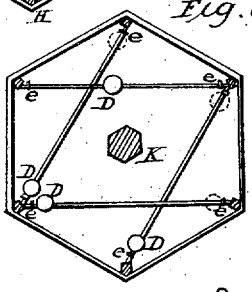
Figure 7:
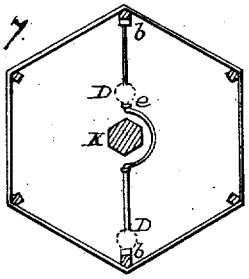
Figure 8:
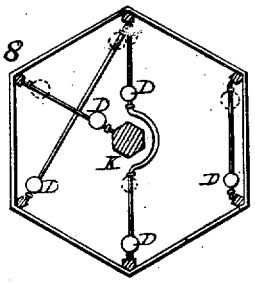
Figure 9:
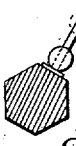
Figure 10:
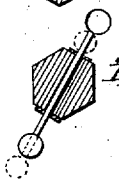

Figure 1 is a perspective view of the reel with the cloth removed, showing the application of the knockers to it. Fig. 2 is a transverse section through the reel of Fig. 1. Fig. 3 shows in detail the manner of holding the knockers when they are not required to operate. Fig. 4 shows a modification of Figs. 1 and 2, wherein the knockers drop from rib to rib. Fig. 5 is another modification showing the knocker-rod extending from rib to opposite rib around the bolt-shaft. Fig. 6 is still another modification, showing the knocker-rod extending from every alternate rib to rib. Fig. 7 is a modification of Fig. 5, wherein the knocker-rods extend from rib to opposite rib and do not come in contact with the bolt-shaft. Fig. 8 is a transverse section through a bolt-reel, showing the application of the several plans above referred to in one reel. Figs. 9 and 10 show the old methods of applying knockers to the shaft of the bolting-reel.

Similar letters of reference indicate corresponding parts in the several figures above referred to.

One of the most familiar modes of applying knockers within a bolting-reel is to arrange sliding weights on short projecting arms of the central shaft, or to pass short loaded arms through the shaft, and allow the arms a freedom to slide back and forth radially, as illustrated in Figs. 9 and 10 of the drawings. By these means the jar upon the bolting-cloth is produced not directly, but indirectly, because the force travels through the central shaft, then along the arms of the reel to the ribs, and from the ribs to the cloth, thus distributing the jar over the entire reel, and consequently giving but little jar at a point where the greatest is required. This universal distribution of the jarring action has never fully met the requirements of millers.

My invention consists in so applying sliding knockers or gravitating weights within a bolting-reel that the jarring action or force necessary to keep the cloth clean or open is transmitted from the knockers directly upon the bolting-cloth or the ribs thereof, and not first through or from the shaft of the reel, as hitherto.

It also consists in giving a jarring action directly to the bolting-cloth or the ribs thereof by means of independent knockers arranged within the reel, in such a relation with the circumference thereof that I secure all the jarring action of each knocker at the required time and place.

To enable others skilled in the art to make and use my invention, I will proceed to describe its construction and operation.

K represents the hexagonal reel-shaft, which may be made either of wood or of metal, and L L′ are the bridge-trees on which this shaft K has its bearings in the journal-boxes *a a′*.

S is the open head of the reel, and S′ is the hexagonal frame at the opposite end of the reel to this head.

H H represent the six ribs, around which the bolting-cloth is to be stretched, which are secured at their ends to the head S and frame S′, respectively. The whole being now braced around the central shaft, K, by means of the radial arms F F, a reel is formed ready for the bolting-cloth, which does not differ in any respect from bolting-reels that are in common use.

In the middle of the length of the reel of Figs. 1 and 2, and suitably secured to the shaft R, I arrange a number of radial rods, A. In the present instance there are six of these rods, which are secured in any suitable manner at their outer ends to the respective longitudinal ribs H. These rods, it will be seen by reference to the Figs. 1 and 2, are all in the same plane. Upon each one of these rods A is a sliding ball or weight, D, which is allowed to slide back and forth freely as the reel is rotated on its axis. Being controlled entirely by gravity, these weights D alternately fall toward the circumference of the reel, and toward the shaft K, as each rod is brought in a perpendicular position.

The concussion which would be occasioned by the falling of the balls D upon the shaft K is neutralized to a great degree by employing springs G G, which receive the balls and break their fall, and thus prevent a jar upon the central shaft where it is not required. At the extreme outer ends of the rods A, and abutting against the inside edges of the ribs H, I place metal plates *b*, which receive the balls D as they fall down, and prevent unnecessary wearing on the ribs.

The bearing of the central shaft, K, or the bridge-tree L′, upon which one end of this shaft has its bearing, is mounted at one end, the other end being hinged on a spring, J, which rests on a fixed bar or support, J′, and the rod *c*, which projects up from J′, through the center of the spring J, and through the free end of the bridge-tree, serves as a guide for the bridge-tree, and also to keep the spring in its place. The object of this spring is to give elasticity to the bolt, and thus make it more sensitive to the effect of the balls D striking against the ribs H.

In Figs. 2 and 3 of the drawings I have represented a device for holding the balls D in a fixed position near the shaft K when it is not desired to use them. This device consists of a rod, E, (or rods,) which runs along the line of the shaft K, and being bent at its end nearest the balls, as shown in the drawings, Fig. 3, this end will pass over a ball and hold the ball firmly in its place. The rod E can be operated from the opening in the end of the reel by attaching a handle to its outer end.

The operation of my invention is as follows: The flour, being fed into the bolt in the usual manner, is carried, as the reel revolves, to an elevation equal to the top of the reel or highest point of its revolution, being held upon the sides of the ribs H in consequence of their flaring shape, as shown in the cross-section, Fig. 2. The flour then falls from the ribs over the shaft, striking the bolting-cloth just after the action of the balls D has cleared the section of this cloth of all the gummy or adhesive flour, thereby allowing the clear raspy meshes of the cloth as the offals fall forcibly upon it to dust the bran. I thereby save the necessity of a bran-duster.

When the effect of only a part of the number of balls D is required, any number of them may be stopped by confining them with the rods E, one of which rods has been above described. The advantages of my improvement are seen in the fact that I am enabled by it to accomplish more work with a fine grade of cloth, using the same sized reel, and it is a fact well know to millers that in order to produce an extra quantity of flour fine cloth must be used. It is necessary when bolting by the ordinary mode to use different parts of the bolt, or different kinds of bolting-cloth in dry and wet weather, as well as for wheat possessing different degrees of moisture.

By my improvement it will be seen that I can use the finest cloth at all times and under all ordinary circumstances, regulating its operation by the balls D, the effect being increased or diminished in proportion to the number of these balls used.

By using the rods E the bolt may be regulated without stopping the mill. Another advantage which this bolt possesses is that it requires less bolting-reel, hence taking up less room in a mill; at the same time it produces more flour from a bushel of wheat, and of a better quality, than that produced by the common bolt.

I have represented in the annexed drawings several modifications of the manner of arranging the balls, hammers, or knockers within the reel so that they will communicate their jarring action directly to the ribs or to the circumference of the reel, and in all of these modifications it will be seen that I do not transmit the concussion or jarring action caused by the falling of these balls from the shaft, then along the radial arms of the reel to the ribs, and then to the cloth, for I would in this way give the entire reel a shaking action, and the force of the falling balls would not be concentrated or received directly upon any one point of the reel's circumference, but all over it, and thus the force would be greatly expended disadvantageously. By the arrangement of the rods A A from rib to rib around the circumference, the same effect is obtained as in Figs. 1 and 2—viz., the concussion of the falling balls is brought directly to bear upon the circumference of the reel. The jogs or stops *e e* which I use in Fig. 4 are intended merely to prevent the constant falling of the balls from wearing out the ribs. Fig. 5 a'so shows a modification of Figs. 1 and 2, where the rods which carry the balls or knockers are not connected to the central shaft, but pass around this shaft and extend diametrically across the reel. Fig. 8 shows the several different modes of arranging the rods (which carry the sliding knockers) in one reel, if desired. In all of these figures the application of the principle of operation of Figs. 1 and 2 is clearly shown; and it will be seen that in no instance do I depend for the jarring action upon the balls or knockers striking the central shaft.

Having thus described my invention, what I claim as new, and desire to secure by Letters Patent, is—

1. The use of the revolving bolting-reel frame instead of the central shaft, as the support for the knockers, substantially as set forth.

2. Causing sliding knockers or weights, when arranged within the reel, to strike upon or near the circumference of the reel in such a manner that the concussion of each knocker separately is felt at the points of striking, substantially as herein described.

3. The sliding knockers D, in combination with the shaft K, ribs H, and rods E, when constructed and operated substantially as and for the purposes set forth.

4. The springs G, in combination with the knockers D, when operated substantially as and for the purposes set forth.

5. The elastic bridge-tree L′, when used substantially as and for the purposes set forth.

6. Holding the knockers, one or more, in a fixed position on their rods, substantially as anfor the purposes described.

LEVI SIMPSON REYNOLDS.

Witnesses:

WM. M. BROWN,

P. H. BLOSSER.